United States Patent
Oulès

(10) Patent No.: US 10,742,882 B1
(45) Date of Patent: *Aug. 11, 2020

(54) SYSTEMS AND METHODS FOR FRAMING VIDEOS

(71) Applicant: GoPro, Inc., San Mateo, CA (US)

(72) Inventor: Guillaume Oulès, Bordeaux (FR)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/415,760

(22) Filed: May 17, 2019

(51) Int. Cl.
  *H04N 13/359* (2018.01)
  *H04N 5/232* (2006.01)

(52) U.S. Cl.
  CPC ....... *H04N 5/23238* (2013.01); *H04N 13/359* (2018.05)

(58) Field of Classification Search
  None
  See application file for complete search history.

(56) References Cited

U.S. PATENT DOCUMENTS

| | | | | |
|---|---|---|---|---|
| 10,002,640 | B2* | 6/2018 | Kopf | G11B 27/034 |
| 10,083,718 | B1* | 9/2018 | Patry | G11B 27/031 |
| 10,341,564 | B1* | 7/2019 | Derbanne | H04N 5/23267 |
| 10,574,894 | B2* | 2/2020 | Derbanne | H04N 5/23258 |
| 10,587,855 | B1* | 3/2020 | Chinnaiyan | H04N 13/111 |
| 2011/0063440 | A1* | 3/2011 | Neustaedter | H04N 7/147 |
| | | | | 348/143 |
| 2014/0349750 | A1* | 11/2014 | Thompson | A63F 13/537 |
| | | | | 463/31 |
| 2015/0248916 | A1* | 9/2015 | Kopf | G06T 5/002 |
| | | | | 386/278 |
| 2015/0375117 | A1* | 12/2015 | Thompson | H04N 21/254 |
| | | | | 463/9 |
| 2017/0072321 | A1* | 3/2017 | Thompson | A63F 13/828 |
| 2017/0195561 | A1* | 7/2017 | Hegelich | G06K 9/6278 |
| 2017/0195568 | A1* | 7/2017 | Leizerovich, Jr. | H04N 5/04 |
| 2017/0238805 | A1* | 8/2017 | Addison | A61B 5/7485 |
| 2018/0367777 | A1* | 12/2018 | Li | H04N 5/23206 |
| 2018/0373413 | A1* | 12/2018 | Sawaki | H04N 13/332 |
| 2019/0034735 | A1* | 1/2019 | Cuban | G06K 9/00771 |
| 2019/0035091 | A1* | 1/2019 | Bi | G08B 13/19602 |
| 2019/0035104 | A1* | 1/2019 | Cuban | G06K 9/00771 |
| 2019/0037234 | A1* | 1/2019 | Ahonen | H04N 19/58 |
| 2019/0075236 | A1* | 3/2019 | Cheung | G06K 9/00295 |
| 2019/0075237 | A1* | 3/2019 | Cheung | H04N 7/141 |
| 2019/0075238 | A1* | 3/2019 | Cheung | G06F 3/013 |
| 2019/0076741 | A1* | 3/2019 | Thompson | H04N 21/25891 |
| 2019/0110087 | A1* | 4/2019 | Parasseeri | H04N 21/23434 |
| 2019/0122082 | A1* | 4/2019 | Cuban | H04N 21/251 |
| 2019/0197789 | A1* | 6/2019 | Macauley | H04N 21/2187 |
| 2019/0200058 | A1* | 6/2019 | Hall | H04N 21/4667 |
| 2019/0348075 | A1* | 11/2019 | Derbanne | H04N 5/23267 |
| 2019/0356856 | A1* | 11/2019 | Derbanne | H04N 5/23258 |
| 2019/0356857 | A1* | 11/2019 | Derbanne | H04N 5/23267 |

(Continued)

*Primary Examiner* — Reza Aghevli
(74) *Attorney, Agent, or Firm* — Esplin & Associates, PC

(57) ABSTRACT

A video may include a capture of a scene, such as a wide-field of view capture of the scene. A punchout of the video may provide a framing of the captured scene. The punchout may be determined based on the context of the video, such as the type of captured scene within the video, the motion of the image capture device that captured the video, and/or the motion of one or more things within the captured scene.

20 Claims, 12 Drawing Sheets

(56) References Cited

U.S. PATENT DOCUMENTS

| | | | | |
|---|---|---|---|---|
| 2019/0379834 A1* | 12/2019 | Derbanne | ............ | H04N 5/23267 |
| 2020/0053404 A1* | 2/2020 | Hall | ...................... | H04N 13/117 |
| 2020/0075057 A1* | 3/2020 | Clark | .................... | H04N 13/106 |

* cited by examiner

902

904

906

908

910

912

1002

1004

1006

1008

1010

1202

1204

1206

1208

1210

1212

SYSTEMS AND METHODS FOR FRAMING VIDEOS

FIELD

This disclosure relates to framing videos based on context of the videos.

BACKGROUND

A video may include greater visual capture of one or more scenes, objects, and/or activities than may be viewed at a time. Determining which portion(s) of the video should be presented during playback may be difficult and time consuming.

SUMMARY

This disclosure relates to framing videos. Video information defining a video and/or other information may be obtained. The video may include video content having a progress length. The video content may include visual content viewable as a function of progress through the progress length. The visual content may have a field of view. Context of the video content as the function of progress through the progress length may be assessed. A viewing window for the visual content may be determined based on the context of the video content and/or other information. The viewing window may be located within the field of view of the visual content. The viewing window may extents of the visual content to be included within framed visual content as the function of progress through the progress length. Location of the viewing window within the field of view of the visual content may determine framing of the visual content. The framed visual content may be generated based on the viewing window and/or other information. The framed visual content may include a punchout of the extents of the visual content within the viewing window.

A system that frames videos may include one or more electronic storages, one or more processors, and/or other components. An electronic storage may store video information defining video content, information relating to video content, information relating to visual content, information relating to context of video content, information relating to a viewing window, information relating to framed visual content, information relating to a punchout of visual content, and/or other information. In some implementations, the system may include one or more optical elements, one or more image sensors, one or more position sensors, and/or other components.

One or more components of the system may be carried by a housing, such as a housing of an image capture device. For example, the optical element(s), the image sensor(s), and/or the position sensor(s) of the system may be carried by the housing of an image capture device. The housing may carry other components, such as the processor(s) and/or the electronic storage.

The processor(s) may be configured by machine-readable instructions. Executing the machine-readable instructions may cause the processor(s) to facilitate framing videos. The machine-readable instructions may include one or more computer program components. The computer program components may include one or more of a video information component, a context component, a viewing window component, a generation component, and/or other computer program components.

The video information component may be configured to obtain video information and/or other information. Video information may define a video. The video may include video content having a progress length. The video content may include visual content viewable as a function of progress through the progress length. The visual content may have a field of view.

In some implementations, the video content may include spherical video content. The spherical video content may include the visual content viewable from a point of view as the function of progress through the progress length. The field of view of the visual content may be a spherical field of view.

The context component may be configured to assess context of the video content as the function of progress through the progress length. In some implementations, the context of the video content may be assessed as being of an action type, a setting type, a social type, and/or other types. In some implementations, the context of the video content may include capture motion of the video content, content motion of the video content, and/or other motion. The capture motion of the video content may include motion of one or more image capture devices that captured the video content. The content motion of the video content may include motion of one or more things captured within the video content.

The viewing window component may be configured to determine a viewing window for the visual content based on the context of the video content and/or other information. The viewing window may be located within the field of view. The viewing window may define one or more extents of the visual content to be included within framed visual content as the function of progress through the progress length of the video content. Location of the viewing window within the field of view of the visual content may determine framing of the visual content.

In some implementations, projection of the visual content within the viewing window may further determine the framing of the visual content. The viewing window may be determined to include one or more changes in projection of the visual content based the context of the video content and/or other information. In some implementations, a change in the projection of the visual content may include a switch between a non-stereographic projection and a stereographic projection to present the extents of the visual content within the viewing window.

For example, the viewing window may be determined to include one or more changes in projection of the visual content (such as a switch between a non-stereographic projection and a stereographic projection to present the extents of the visual content within the viewing window) based on the motion of the image capture device including the image capture device being thrown during capture of the video content, the motion of a thing including the thing jumping or being thrown, and/or other motion.

The generation component may be configured to generate the framed visual content based on the viewing window and/or other information. The framed visual content may include a punchout of the extent(s) of the visual content within the viewing window.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
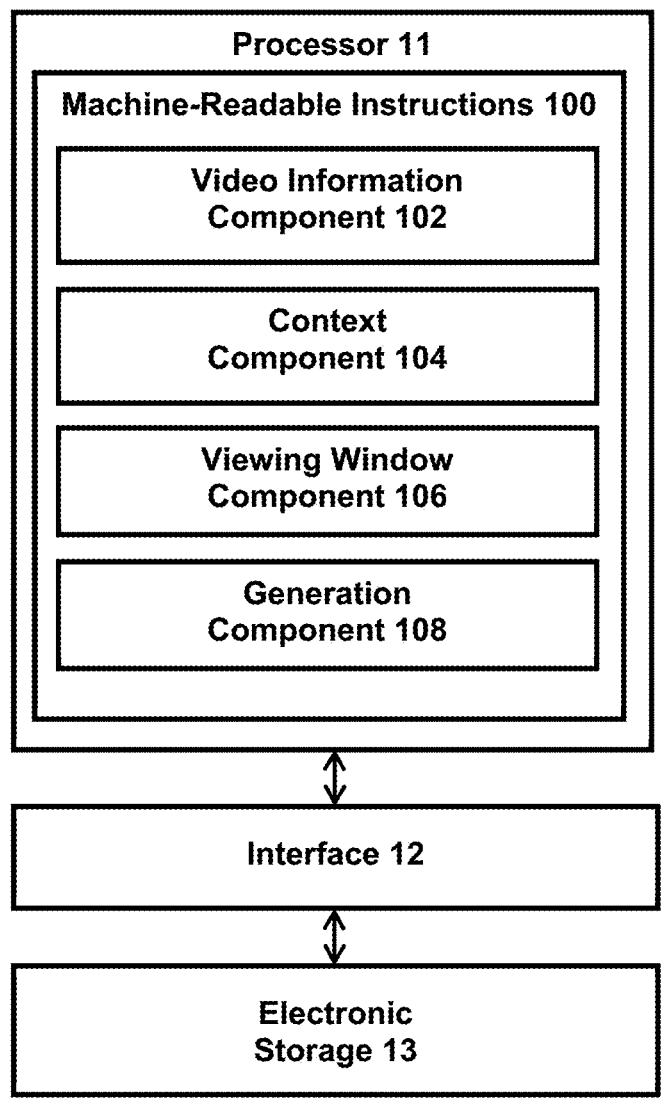
FIG. 1 illustrates an example system that frames videos.

FIG. 1 illustrates a system 10 for framing videos. The system 10 may include one or more of a processor 11, an interface 12 (e.g., bus, wireless interface), an electronic storage 13, and/or other components. In some implementations, the system 10 may include one or more optical elements, one or more image sensors, one or more position sensors, and/or other components. Video information defining a video and/or other information may be obtained by the processor 11. The video may include video content having a progress length. The video content may include visual content viewable as a function of progress through the progress length. The visual content may have a field of view. Context of the video content as the function of progress through the progress length may be assessed. A viewing window for the visual content may be determined based on the context of the video content and/or other information. The viewing window may be located within the field of view of the visual content. The viewing window may extents of the visual content to be included within framed visual content as the function of progress through the progress length. Location of the viewing window within the field of view of the visual content may determine framing of the visual content. The framed visual content may be generated based on the viewing window and/or other information. The framed visual content may include a punchout of the extents of the visual content within the viewing window.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store video information defining video content, information relating to video content, information relating to visual content, information relating to context of video content, information relating to a viewing window, information relating to framed visual content, information relating to a punchout of visual content, and/or other information.

Visual content may refer to content of one or more images and/or one or more videos that may be consumed visually. For example, visual content may be defined within one or more images and/or one or more video frames of a video. For instance, video frame(s) of a video may define the visual content of the video. Video frame(s) may define visual content viewable as a function of progress through a progress length of the video. A video frame may include an image of the video at a moment within the progress length of the video. Visual content may be generated based on light received within a field of view of a single image sensor or within fields of view of multiple image sensors during a capture period.

Visual content may be stored in one or more formats and/or one or more containers. A format may refer to one or more ways in which the information defining visual content is arranged/laid out (e.g., file format). A container may refer to one or more ways in which information defining visual content is arranged/laid out in association with other information (e.g., wrapper format). Information defining visual content (visual information) may be stored within a single file or multiple files. For example, visual information defining an image or video frames of a video may be stored within a single file (e.g., image file, video file), multiple files (e.g., multiple image files, multiple video files), a combination of different files, and/or other files.

Visual content may include spherical visual content. Spherical visual content may include visual content viewable from one or more points of view (e.g., within a sphere, center of a sphere). Spherical visual content may refer to visual content generated through capture of multiple views from a single location. Spherical visual content may be captured through the use of one or more image capture devices to capture images from a location. The captured images may be stitched together to form the spherical visual content (spherical image). Spherical visual content may include full spherical visual content (360 degrees of capture) or partial spherical visual content (less than 360 degrees of capture). Partial spherical visual content may be referred to as panoramic visual content.

Content of one or more videos may be referred to as video content. Video content may have a progress length. That is, a video may include video content having a progress length. A progress length may be defined in terms of time durations and/or frame numbers. For example, video content of a video may have a time duration of 60 seconds. Video content of a video may have 1800 video frames. Video content having 1800 video frames may have a play time duration of 60 seconds when viewed at 30 frames per second. Other progress lengths, time durations, and frame numbers are contemplated.

Video content may include visual content, audio content, and/or other content. For example, video content may include visual content viewable as a function of progress through the progress length of the video content, audio content playable as a function of progress through the progress length of the video content, and/or other content that may be played back as a function of progress through the progress length of the video content.

Audio content may include audio/sound captured (e.g., by sound sensor(s), microphone(s)) with the capture of the visual content and/or audio/sound provided as an accompaniment for the visual content. Audio content may include one or more of voices, activities, songs, music, and/or other audio/sounds. For example, audio content may include sounds captured by a single sound sensor or an array of sound sensors. The sound sensor(s) may receive and convert sounds into output signals. The output signals may convey sound information and/or other information. The sound information may define audio content in one or more formats, such as WAV, MP3, MP4, RAW. Audio content may include audio/sound generated by one or more computing devices, such as procedural audio. Audio content may be synchronized with the visual content. For example, audio content may include music, song, and/or soundtrack, and the visual content of the video content may be synchronized with music, song, and/or soundtrack.

Video content may include one or more of spherical video content, virtual reality content, and/or other video content. Spherical video content and/or virtual reality content may include visual content viewable from one or more points of view as a function of progress through the progress length of the spherical/virtual reality video content.

Spherical video content may refer to video content generated through capture of multiple views from a single location. Spherical video content may be captured through the use of one or more image capture devices to capture images/videos from a location. The captured images/videos may be stitched together to form the spherical video content. Spherical video content may include full spherical video content (360 degrees of capture) or partial spherical video content (less than 360 degrees of capture). Partial spherical video content may be referred to as panoramic video content.

Visual content of spherical video content may be included within one or more spherical video frames of the spherical video. The spherical video frame(s) may define the visual content of the video content. That is, spherical video content may include spherical video frame(s) that define the visual content of the spherical video content. Spherical video frame(s) may define visual content viewable from a point of view (e.g., within a sphere, center of a sphere) as a function of progress through the progress length of the spherical video content.

A spherical video frame may include a spherical image of the spherical video content at a moment within the progress length of the spherical video content. Visual content of spherical video content may be generated based on light received within a field of view of a single image sensor or within fields of view of multiple image sensors during a capture period. For example, multiple images/videos captured by multiple cameras/image sensors may be combined/stitched together to form the visual content of the spherical video content. The field of view of camera(s)/image sensor(s) may be moved/rotated (e.g., via movement/rotation of optical element(s), such as lens, of the image sensor(s)) to capture multiple images/videos from a location, which may be combined/stitched together to form the visual content of the spherical video content.

For example, multiple images captured by multiple cameras/images sensors at a moment in time may be combined/stitched together to form a spherical video frame for the moment in time. A spherical video frame may include a full spherical image capture (360-degrees of capture, including opposite poles) or a particular spherical image capture (less than 360-degrees of capture). A spherical image (e.g., spherical video frame) may be comprised of multiple sub-images (sub-frames). Sub-images may be generated by a single image sensor (e.g., at different times as the field of view of the image sensor is rotated) or by multiple image sensors (e.g., individual sub-images for a moment in time captured by individual image sensors and combined/stitched together to form the spherical image).

In some implementations, spherical video content may be stored with a 5.2K resolution. Using a 5.2K spherical video content may enable viewing windows (e.g., directed to a portion of a spherical video frame) for the spherical video content with resolution close to 1080p. In some implementations, spherical video content may include 12-bit video frames. Other sizes and qualities of spherical video content are contemplated.

Figure 3:
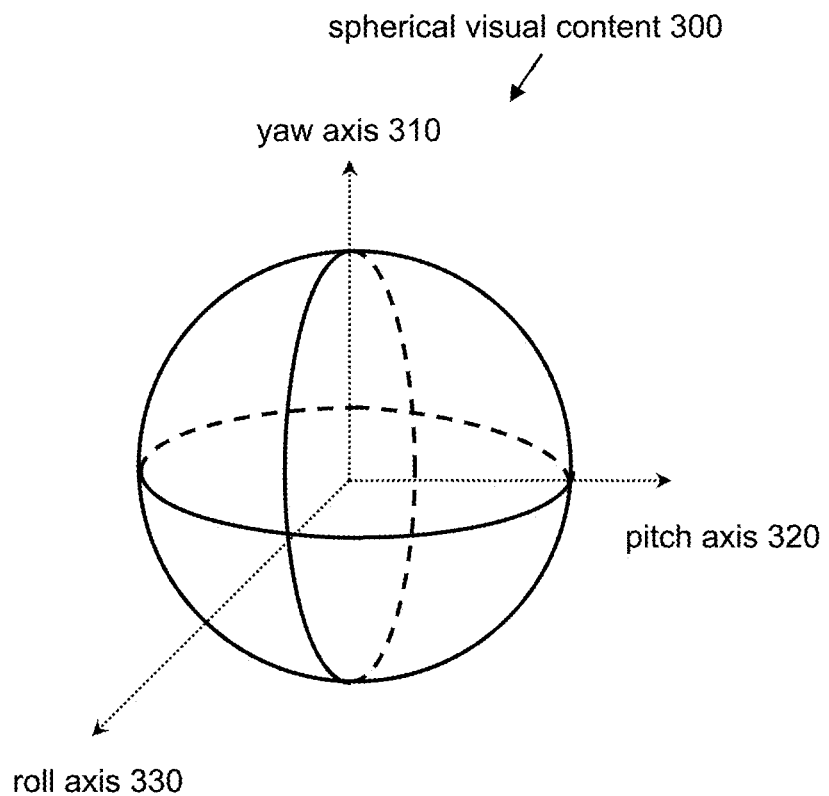
FIG. 3 illustrates an example spherical visual content.

FIG. 3 illustrates an example spherical visual content 300. The spherical visual content 300 may include content of a spherical image or a spherical video. The spherical visual content 300 may include visual content viewable from a point of view (e.g., center of sphere) as a function of progress through the progress length of the spherical visual content 300. FIG. 3 illustrates example rotational axes for the spherical visual content 300. Rotational axes for the spherical visual content 300 may include a yaw axis 310, a pitch axis 320, a roll axis 330, and/or other axes. Rotations about one or more of the yaw axis 310, the pitch axis 320, the roll axis 330, and/or other axes may define directions of view (e.g., viewing directions) for the spherical visual content 300.

For example, a 0-degree rotation of the spherical visual content 300 around the yaw axis 310 may correspond to a front viewing direction. A 90-degree rotation of the spherical visual content 300 around the yaw axis 310 may correspond to a right viewing direction. A 180-degree rotation of the spherical visual content 300 around the yaw axis 310 may correspond to a back-viewing direction. A −90-degree rotation of the spherical visual content 300 around the yaw axis 310 may correspond to a left viewing direction.

A 0-degree rotation of the spherical visual content 300 around the pitch axis 320 may correspond to a viewing direction that may be level with respect to horizon. A 45-degree rotation of the spherical visual content 300 around the pitch axis 320 may correspond to a viewing direction that may be pitched up with respect to horizon by 45-degrees. A 90-degree rotation of the spherical visual content 300 around the pitch axis 320 may correspond to a viewing direction that may be pitched up with respect to horizon by 90-degrees (looking up). A −45-degree rotation of the spherical visual content 300 around the pitch axis 320 may correspond to a viewing direction that may be pitched down with respect to horizon by 45-degrees. A −90-degree rotation of the spherical visual content 300 around the pitch axis 320 may correspond to a viewing direction that may be pitched down with respect to horizon by 90-degrees (looking down).

A 0-degree rotation of the spherical visual content 300 around the roll axis 330 may correspond to a viewing direction that may be upright. A 90-degree rotation of the spherical visual content 300 around the roll axis 330 may correspond to a viewing direction that may be rotated to the right by 90-degrees. A −90-degree rotation of the spherical visual content 300 around the roll axis 330 may correspond to a viewing direction that may be rotated to the left by 90-degrees. Other rotations and viewing directions are contemplated.

A playback of video content (e.g., the spherical video content) may include presentation of one or more portions of visual content on one or more displays based on a viewing window and/or other information. A viewing window may define extents of the visual content viewable on one or more displays as the function of progress through the progress length of the video content. The viewing window may define extents of the visual content presented on the display(s) as the function of progress through the progress length of the video content. For spherical video content, the viewing window may define extents of the visual content viewable from the point of view as the function of progress through the progress length of the spherical video content.

The viewing window may be characterized by viewing directions, viewing sizes (e.g., viewing zoom, viewing magnification), viewing rotations, and/or other information. A viewing direction may define a direction of view for video content. A viewing direction may define the angle/visual portion of the video content at which the viewing window may be directed. A viewing direction may define a direction of view for the video content selected by a user, defined by instructions for viewing the video content, and/or determined based on other information about viewing the video content as a function of progress through the progress length of the video content (e.g., director track specifying viewing direction to be presented during playback as a function of progress through the progress length of the video content). For spherical video content, a viewing direction may define a direction of view from the point of view from which the visual content may be defined. Viewing directions for the video content may be characterized by rotations around the yaw axis 310, the pitch axis 320, the roll axis 330, and/or other axes. For example, a viewing direction of a 0-degree rotation of the video content around a yaw axis (e.g., the yaw axis 310) and a 0-degree rotation of the video content around a pitch axis (e.g., the pitch axis 320) may correspond to a front viewing direction (the viewing window may be directed to a forward portion of the visual content captured within the spherical video content).

Figure 4:
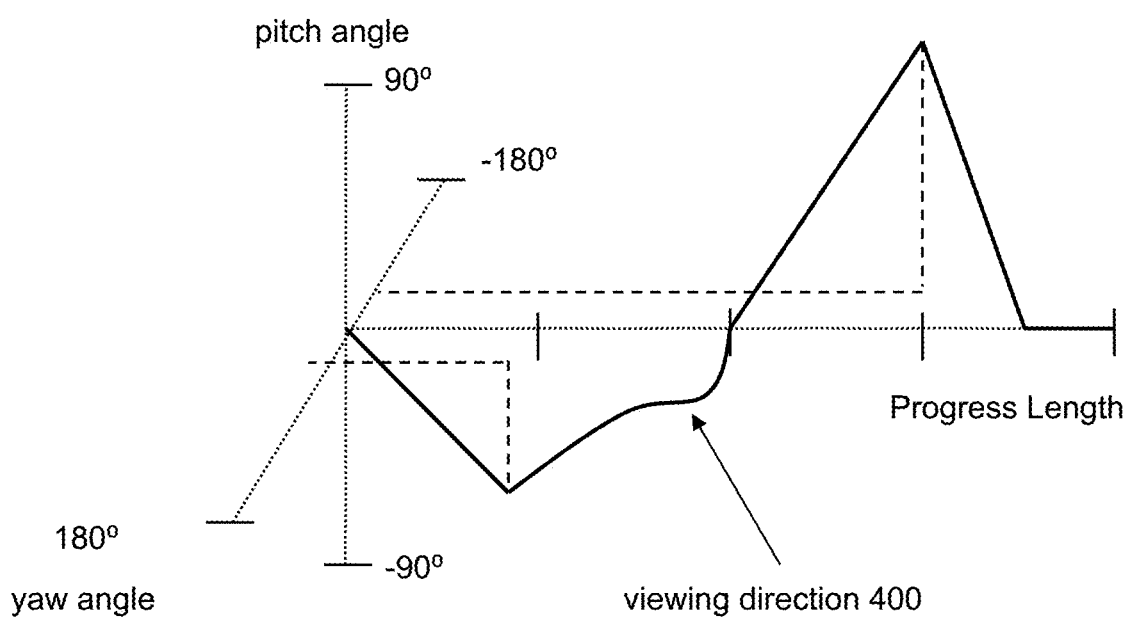
FIG. 4 illustrates example viewing directions for spherical video content.

For example, FIG. 4 illustrates example changes in viewing directions 400 (e.g., selected by a user for video content, specified by a director's track) as a function of progress through the progress length of the video content. The viewing directions 400 may change as a function of progress through the progress length of the video content. For example, at 0% progress mark, the viewing directions 400 may correspond to a zero-degree yaw angle and a zero-degree pitch angle. At 25% progress mark, the viewing directions 400 may correspond to a positive yaw angle and a negative pitch angle. At 50% progress mark, the viewing directions 400 may correspond to a zero-degree yaw angle and a zero-degree pitch angle. At 75% progress mark, the viewing directions 400 may correspond to a negative yaw angle and a positive pitch angle. At 87.5% progress mark, the viewing directions 400 may correspond to a zero-degree yaw angle and a zero-degree pitch angle. The viewing directions 400 may define a path of movement for the viewing window (e.g., a trajectory followed by the viewing window) as a function of progress through the progress length of the video content. Other viewing directions are contemplated.

A viewing size may define a size of the viewing window. A viewing size may define a size (e.g., size, magnification, viewing angle) of viewable extents of visual content within the video content. A viewing size may define the dimensions of the viewing window. A viewing size may define a size of viewable extents of visual content within the video content selected by a user, defined by instructions for viewing the video content, and/or determined based on other information about viewing the video content as a function of progress through the progress length of the video content (e.g., director track specifying viewing size to be presented as a function of progress through the progress length of the video content). In some implementations, a viewing size may define different shapes of viewable extents. For example, a viewing window may be shaped as a rectangle, a triangle, a circle, and/or other shapes.

A viewing rotation may define a rotation of the viewing window. A viewing rotation may define one or more rotations of the viewing window about one or more axis. In some implementations, a viewing rotation may be defined by one or more parameters of a viewing direction. For example, a viewing rotation may be defined based on rotation about an axis (e.g., the roll axis 330) corresponding to a viewing direction. A viewing rotation may define a rotation of the viewing window selected by a user, defined by instructions for viewing the video content, and/or determined based on other information about viewing the video content as a function of progress through the progress length of the video content (e.g., director track specifying viewing rotation to be used as a function of progress through the progress length of the video content). For example, a viewing rotation of a viewing window having a rectangular shape may determine whether the rectangular viewing window is to be positioned in a portrait orientation (e.g., for a portrait view of the video content), in a landscape orientation (e.g., for a landscape view of the video content), and/or other orientation with respect to the visual content of the video content.

Figures 5A, 5B:
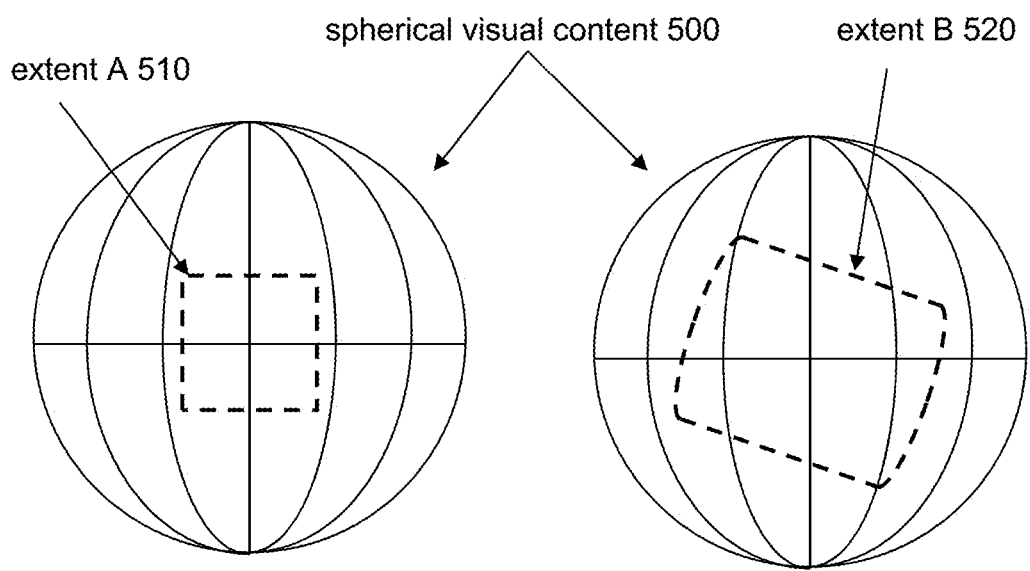
FIGS. 5A-5B illustrate example extents of spherical visual content.

FIGS. 5A-5B illustrate examples of extents for spherical visual content 500. In FIG. 5A, the size of the viewable extent of the spherical visual content 500 may correspond to the size of extent A 510. In FIG. 5B, the size of viewable extent of the spherical visual content 500 may correspond to the size of extent B 520. Viewable extent of the spherical visual content 500 in FIG. 5A may be smaller than viewable extent of the spherical visual content 500 in FIG. 5B. The viewable extent of the spherical visual content 500 in FIG. 5B may be more tilted with respect to the spherical visual content 500 than viewable extent of the spherical visual content 500 in FIG. 5A. Other viewing sizes and viewing rotations are contemplated.

Figure 6:
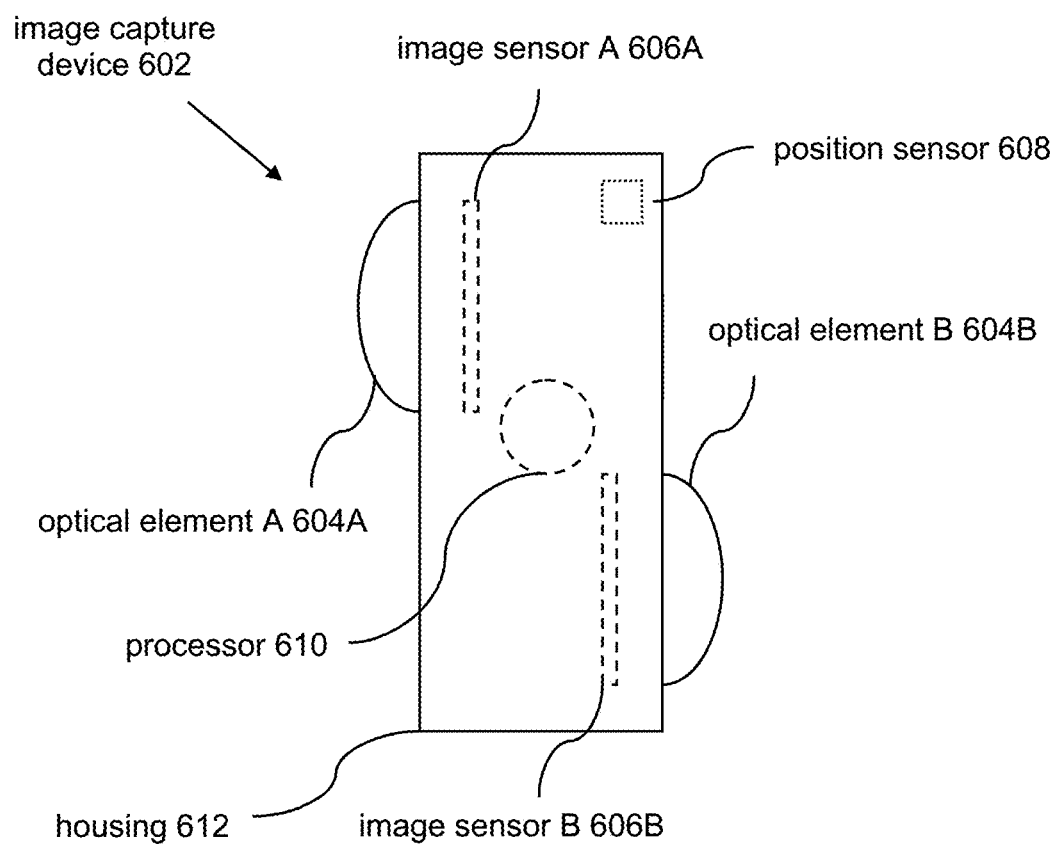
FIG. 6 illustrates an example image capture device.

An image capture device may refer to a device captures visual content. An image capture device may capture visual content in form of images, videos, and/or other forms. For example, an image capture device may refer to a camera and/or an image sensor. An image capture device may be a standalone device (e.g., camera) or may be part of another device (e.g., part of a smartphone). FIG. 6 illustrates an example image capture device 602. Visual content may be captured by the image capture device 602 during a capture duration. The image capture device 602 may include a housing 612, and the housing 612 may carry (be attached to, support, hold, and/or otherwise carry) one or more of an optical element A 604A, an optical element B 604B, an image sensor A 606A, an image sensor B 606B, a position sensor 608, a processor 610, and/or other components. In some implementations, an image capture device may include a non-spherical image capture device. Other configurations of image capture devices are contemplated.

One or more components of the image capture device 602 may be the same as, be similar to, and/or correspond to one or more components of the system 10. For example, the processor 610 may be the same as, be similar to, and/or correspond to the processor 11.

The optical elements 604A, 604B may include instrument(s), tool(s), and/or medium that acts upon light passing through the instrument(s)/tool(s)/medium. For example, the optical elements 604A, 604B may include one or more of lens, mirror, prism, and/or other optical elements. The optical elements 604A, 604B may affect direction, deviation, and/or path of the light passing through the optical elements 604A, 604B. While the optical elements 604A, 604B are shown in a staggered configuration, this is merely an example.

The image sensors 606A, 606B may include sensor(s) that converts received light into output signals. The output signals may include electrical signals. The image sensors 606A, 606B may generate output signals conveying information that defines visual content of one or more images and/or one or more video frames of a video. For example, the image sensors 606A, 606B may include one or more of a charge-coupled device sensor, an active pixel sensor, a complementary metal-oxide semiconductor sensor, an N-type metal-oxide-semiconductor sensor, and/or other image sensors.

The image sensors 606A, 606B may be configured to generate output signals conveying visual information (defining visual content of images and/or videos) based on light that becomes incident thereon and/or other information. The optical element A 604A may be configured to guide light within a field of view to the image sensor A 606A, and the image sensor A 606A may be configured to generate output signals conveying visual information based on light that becomes incident thereon via the optical element A 604A. The optical element B 604B may be configured to guide light within a field of view to the image sensor B 606B, and the image sensor B 606B may be configured to generate output signals conveying visual information based on light that becomes incident thereon via the optical element B 604B. The fields of view of the optical elements 604A, 604B may refer to the extents of the observable world that is seen through the optical elements 604A, 604B. The field of views of the optical elements 604A, 604B may include one or more angles (e.g., vertical angle, horizontal angle, diagonal angle) at which light is received and passed on by the optical elements 604A, 604B. The fields of view of the optical elements 604A, 604B may be the same or different.

The fields of view of the optical elements 604A, 604B may be greater than or equal to 180-degrees. The optical elements 604A, 604B may be carried by the housing 312 such that peripheral portions of the fields of view of the optical elements 604A, 604B overlap. The overlap of the peripheral portions of the fields of view of the optical elements 604A, 604B may enable capture of spherical visual content (e.g., of images and/or videos) based on the visual information conveyed by the output signals of the image sensors 606A, 606B. That is, the overlap of the peripheral portions of the fields of view of the optical elements 604A, 604B may enable capture of spherical visual content based on visual content defined by the visual information of the image sensor A 606A (visual content captured by the image sensor A 606A) and visual content defined by the visual information of the image sensor B 606B (visual content captured by the image sensor B 606B). function of progress through the capture duration.

The position sensor 608 may include sensor(s) that measures experienced positions and/or motions. The position sensor 608 may convert experienced positions and/or motions into output signals. The output signals may include electrical signals. For example, the position sensor 608 may refer to a set of position sensors, which may include one or more inertial measurement units, one or more accelerometers, one or more gyroscopes, and/or other position sensors. The position sensor 608 may generate output signals conveying information that characterizes positions and/or motions of the position sensor 608 and/or device(s) carrying the position sensor 608, such as the image capture device 602 and/or the housing 612.

For example, the position sensor 608 may be configured to generate a position output signal based on positions of the housing/image capture device during the capture duration. The position output signal may convey position information that characterizes positions of the image capture device 602 at different moments (points in time, time durations) within the capture duration. The position information may characterize positions of the image capture device 602 based on specific translational and/or rotational positions of the image capture device 602 and/or based on changes in translational and/or rotational positions of the image capture device 602 as a function of progress through the capture duration. That is, the position information may characterize translational and/or rotational positions of the image capture device 602 and/or changes in translational and/or rotational positions (motion) of the image capture device 602 (e.g., direction, amount, velocity, acceleration) during the capture duration. The position information may characterize direction of gravity on the image capture device 602 as a function of progress through the capture duration.

The position information may be determined based on signals generated by the position sensor 608 and independent of the information/signals generated by the image sensors 606A, 606B. That is, position information may be determined without using visual content/images/videos generated by the image sensors 606A/606B. Use of visual content/images/videos to determine positions/motions of the image capture device 602 may be computationally expensive in terms of processing power, processing time, and/or battery consumption. Using the information/signals from the position sensor 608 to determine positions/motions of the image capture device 602 may be computationally cheaper. That is, less processing power, processing time, and/or battery consumption may be required when positions/motions of the image capture device 602 are determined from the information/signals from the position sensor 608 than the information/signals from the image sensors 606A, 606B.

The processor 610 may include one or more processors (logic circuitry) that provide information processing capabilities in the image capture device 602. The processor 610 may provide one or more computing functions for the image capture device 602. The processor 610 may operate/send command signals to one or more components of the image capture device 602 to operate the image capture device 602. For example, the processor 610 may facilitate operation of the image capture device 602 in capturing image(s) and/or video(s), facilitate operation of the optical elements 604A, 604B (e.g., change how light is guided by the optical elements 604A, 604B), and/or facilitate operation of the image sensors 606A, 606B (e.g., change how the received light is converted into information that defines images/videos and/or how the images/videos are post-processed after capture).

The processor 610 may obtain information from the image sensors 606A, 606B and/or the position sensor 608, and/or facilitate transfer of information from the image sensors 606A, 606B and/or the position sensor 608 to another device/component. The processor 610 may be remote from the processor 11 or local to the processor 11. One or more portions of the processor 610 may be part of the processor 11 and/or one or more portions of the processor 11 may be part of the processor 610. The processor 610 may include and/or perform one or more functionalities of the processor 11 shown in FIG. 1.

Referring back to FIG. 1, the system 10 may be remote from an image capture device or local to the image capture device. One or more portions of an image capture device may be remote from or a part of the system 10. One or more portions of the system 10 may be remote from or a part of an image capture device. For example, one or more components of the system 10 may be carried by a housing, such as a housing of an image capture device. For instance, optical element(s), image sensor(s), and/or position sensor(s) of the system 10 may be carried by the housing of the image capture device. The housing may carry other components, such as the processor 11, the electronic storage 13, and/or one or more optical elements. References to a housing of an image capture device may refer to the image capture device, and vice versa. For example, references to position/motion of a housing of an image capture device may refer to position/motion of the image capture device, and vice versa.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate framing videos. The machine-readable instructions 100 may include one or more computer program components. The machine-readable instructions 100 may include one or more of a video information component 102, a context component 104, a viewing window component 106, a generation component 108, and/or other computer program components.

The video information component 102 may be configured to obtain video information and/or other information. Obtaining video information may include one or more of accessing, acquiring, analyzing, determining, examining, identifying, loading, locating, opening, receiving, retrieving, reviewing, storing, and/or otherwise obtaining the video information. The video information component 102 may obtain video information from one or more locations. For example, the video information component 102 may obtain information from a storage location, such as the electronic storage 13, electronic storage of information and/or signals generated by one or more sensors, electronic storage of a device accessible via a network, and/or other locations. The video information component 102 may obtain information from one or more hardware components (e.g., an image sensor) and/or one or more software components (e.g., software running on a computing device). Video information may be obtained during acquisition of the video and/or after acquisition of the video by one or more image capture devices. For example, the video information component 102 may obtain video information defining a video while the video is being captured by an image capture device. The video information component 102 may obtain video information defining a video after the video has been captured and stored in memory (e.g., the electronic storage 13).

In some implementations, the video information component 102 may obtain video information based on user interaction with a user interface/application (e.g., video editing application, video player application), and/or other information. For example, a user interface/application may provide option(s) for a user to select one or more videos that are to be framed and/or played. The video information defining the video may be obtained based on the user's selection of the video content through the user interface/video application. Other selections of video for retrieval of video information are contemplated.

Video information may define a video. The video may include video content having a progress length. The video content may include visual content viewable as a function of progress through the progress length. The visual content may have a field of view, such as a narrow field of view, a wide field of view, a panoramic field of view, and/or a spherical field of view. The video content may include other content, such as audio content. Audio content may be captured during capture of the visual content (e.g., recording of sound captured with the images/video frames) and/or may be captured separately from the capture of the visual content (e.g., song/music provide accompaniment for the playback of the images/video frames, sound recorded before/after capture of the images/video frames).

For example, the video may include video content captured by an image capture device during a capture duration. The progress length of the video content may correspond to the capture duration. The progress length of the video content may be determined based on the capture duration. The progress length of the video content may be same as the capture duration, shorter than the capture duration (e.g., playback rate of the video content is faster than the capture rate of the video content), and/or longer than the capture duration (e.g., playback rate of the video content is slower than the capture rate of the video content). The video may include one or more video clips that are combined to generate a video edit.

In some implementations, the video content may include spherical video content. The spherical video content may include the visual content viewable from a point of view as the function of progress through the progress length. The field of view of the visual content may be a spherical field of view. Spherical field of view may include full spherical field of view (360 degrees of capture) or partial spherical field of view (less than 360 degrees of capture). Partial spherical field of view may include panoramic field of view and/or wide field of view.

The context component 104 may be configured to assess context of the video content as the function of progress through the progress length. The context component 104 may assess context of the video content at different moments (points in time, time durations) within the progress length of the video content. Context of the video content may refer to circumstances and/or conditions of the setting and/or scene that is captured within the video content. Context of the video content may include circumstances and/or conditions of the image capture device during capture of the video content. Context of the video content may include circumstances and/or conditions of one or more scenes (e.g., things within field of view of the image capture device) that are captured within the video content.

In some implementations, the context of the video content may be assessed as being of an action type, a setting type, a social type, and/or other types. An action type may refer to the context of the video content in which one or more actions (e.g., sports, activities) are captured. An action type context of the video content may indicate that action aspects of the video content (e.g., visual content, audio content) are of interest to users during playback of the video content. The context of the video content may be assessed as being of an action type based on one or more of user input indicating the action type, visual content including depiction of actions, audio content including sound recording indicative of actions, position information characterizing motion of the image capture device, and/or other information indicating that the action aspect of the visual content is of interest to users.

A setting type may refer to the context of the video content in which one or more settings (e.g., traveling, landmarks, sceneries) are captured. A setting type context of the video content may indicate that setting aspects of the video content (e.g., visual content, audio content) are of interest to users during playback of the video content. The context of the video content may be assessed as being of a setting type based on one or more of user input indicating the setting type, visual content including depiction of landmarks, sceneries, different locations, traveling equipment, and/or exhibits, location information indicating that the locations of the visual content capture reflects traveling by the user of the image capture device, audio content including sound recording indicative of traveling by the user, and/or other information indicating that the setting of the visual content is of interest to users.

A social type may refer to the context of the video content which one or more social events (e.g., social setting/gathering) are captured. A social type context of the video content may indicate that social aspects of the video content (e.g., visual content, audio content) are of interest to users during playback of the video content. The context of the video content may be assessed as being of a social type based on one or more of user input indicating the social type, visual content including depiction of persons in a social event, audio content including sound recording indicative of a social event, and/or other information indicating that the social aspect of the visual content is of interest to users.

In some implementations, the context of the video content may include capture motion of the video content, content motion of the video content, and/or other motion. The capture motion of the video content may include motion of one or more image capture devices that captured the video content during video content capture. The capture motion may include motion of the image capture device(s) at a time, over a duration of time, at a location, or over a range of locations. Motion of an image capture device may include linear (translational) and/or angular (rotational) motion of the image capture device. For example, capture motion may include one or more of linear speed, angular speed, linear acceleration, angular acceleration, linear direction, and/or angular direction of image capture device(s) during capture of the video content. In some implementations, capture motion may include a direction of gravity on the image capture device(s) during video content capture. The direction of gravity may indicate the motion of the image capture device(s) with respect to gravity during capture of the video content (e.g., motion away from direction of gravity, motion towards direction of gravity). For instance, capture motion may include an image capture device being thrown during capture of the video content. Other capture motions are contemplated.

The content motion of the video content may include motion of one or more things (e.g., living things, non-living things, persons, animal, objects, vehicles, machines) captured within the video content. The content motion may include motion of the thing(s) at a time, over a duration of time, at a location, or over a range of locations. Motion of a thing may include linear (translational) and/or angular (rotational) motion of the thing. For example, content motion may include one or more of linear speed, angular speed, linear acceleration, angular acceleration, linear direction, and/or angular direction of thing(s) within field of view of image capture device(s) during capture of the video content. In some implementations, content motion may include a direction of gravity on the image capture device(s) during video content capture. The direction of gravity may indicate the motion of the thing(s) with respect to gravity during capture of the video content (e.g., motion away from direction of gravity, motion towards direction of gravity). For instance, content motion may include a thing jumping or being thrown during capture of the video content. Other content motions are contemplated.

Assessing context of the video content may include one or more of analyzing, calculating, determining, estimating, evaluating, examining, identifying, retrieving, reviewing, and/or otherwise assessing the context of the video content. Assessment of the content of the video content may include qualitative and/or quantitative assessment of the content of the video content. For example, the context component 104 may evaluate and/or estimate the nature of, quality of, and/or quantity reflecting the context of the video content.

Context of the video content may be assessed based on one or more of visual content analysis, audio content analysis, user input analysis, metadata analysis, and/or other information. Visual content analysis may refer to examination of the visual content, such as blur detection, color analysis, face recognition, histogram analysis, object recognition, background recognition, motion recognition, skeletal/pose estimation, activity recognition, scene recognition, salience detection, emotion recognition, and/or other visual content analysis. Audio content analysis may refer to examination of the audio content, such as voice recognition, command recognition, activity recognition, emotion detection, and/or other audio content analysis. User input analysis may refer to examination of inputs provided by one or more users, such as user's quantitative and/or qualitative designation of the context of the video content (e.g., user classifying the context, user providing vales of parameters for classifying the context) and/or other user input analysis. Metadata analysis may include examination of metadata relating to the image capture device during capture of the video content, such as telemetry information, location (GPS) information, position information, speed information, velocity information, acceleration information, rotation information, and/or other information. Other assessment of the context of the video content are contemplated.

The viewing window component 106 may be configured to determine a viewing window for the visual content based on the context of the video content and/or other information. The viewing window component 106 may determine the viewing window for different moments within the progress length of the video content. The viewing window component 106 may determine the viewing window as the function of progress through the progress length of the video content based on the context of the video content as the function of progress through the progress length of the video content.

The viewing window may be located within the field of view of the visual content. The viewing window may define one or more extents of the visual content. The viewing window may define one or more extents of the visual content to be included within framed visual content as the function of progress through the progress length of the video content. Location of the viewing window within the field of view of the visual content may determine framing of the visual content. Inclusion of the extent(s) of the visual content defined by the viewing window within the framed visual content may effectuate framing of the visual content. The context of the video content may be used to determine the type and/or the style of framing to be used for the visual content of the video content. That is, the context of the video content may be used to determine which portion(s) of the visual content (e.g., images, video frames) should be presented during playback of the video content.

Determination of a viewing window may include determination of one or more of shape, size, rotation, movement, and/or other characteristics of the viewing window. For example, one or more of shape, size, rotation, movement, and/or other characteristics of the viewing window may be determined for different moments within the progress length of the visual content based on the context of the video content during the moments and/or other information.

A viewing window may be characterized by viewing directions, viewing sizes (e.g., viewing zoom, viewing magnification), viewing rotations, and/or other information. A viewing direction may define a direction of view for visual content. A viewing direction may define the angle/visual portion of the visual content at which the viewing window may be directed. Changes in the viewing direction as the function of progress through the progress length may effectuate movement (e.g., panning) of the viewing window within the field of view of the visual content.

A viewing size may define a size of the viewing window. A viewing size may define a size (e.g., size, magnification, viewing angle) of viewable extents of visual content. A viewing size may define the dimensions of the viewing window. In some implementations, a viewing size may define different shapes of the viewing window/viewable extents. For example, a viewing window may be shaped as a rectangle, a triangle, a circle, and/or other shapes. A viewing size may define different aspect ratios of the viewing window (e.g., 4:3 aspect ratio, 16:9 aspect ratio, 1:1 aspect ratio). Changes in the viewing size (sizes of the viewing window) as the function of progress through the progress length may simulate changes in zoom of the visual content. The viewing size may be increased to simulate decrease in zoom of the visual content. The viewing size may be decreased to simulate increase in zoom of the visual content.

A viewing rotation may define a rotation of the viewing window. A viewing rotation may define one or more rotations of the viewing window about one or more axis. For example, a viewing rotation may be defined based on rotation about an axis corresponding to a viewing direction (e.g., roll). Changes in the viewing rotation as the function of progress through the progress length may effectuate rotation of the viewing window within the field of view of the visual content. The viewing window may be rotated to compensate for rotation of the image capture device during capture duration. The viewing window may be rotated to provide tilted view of the visual content.

The viewing window may be used to provide a punchout of the visual content. A punchout of the visual content may refer to an output of one or more portions of the visual content for presentation (e.g., current presentation, future presentation based on video generated using the punchout). A punchout of the visual content may refer to extents of the visual content that is obtained for viewing and/or extraction. The extents of the visual content viewable/extracted within the viewing window may be used to provide views of different spatial portions of the visual content. For example, the visual content may include a field of view, and the punchout of the visual content may include the entire extent of the visual content (the visual content within the entire field of view) or one or more extents of the visual content (the visual content within one or more portions of the field of view.

Figure 7:
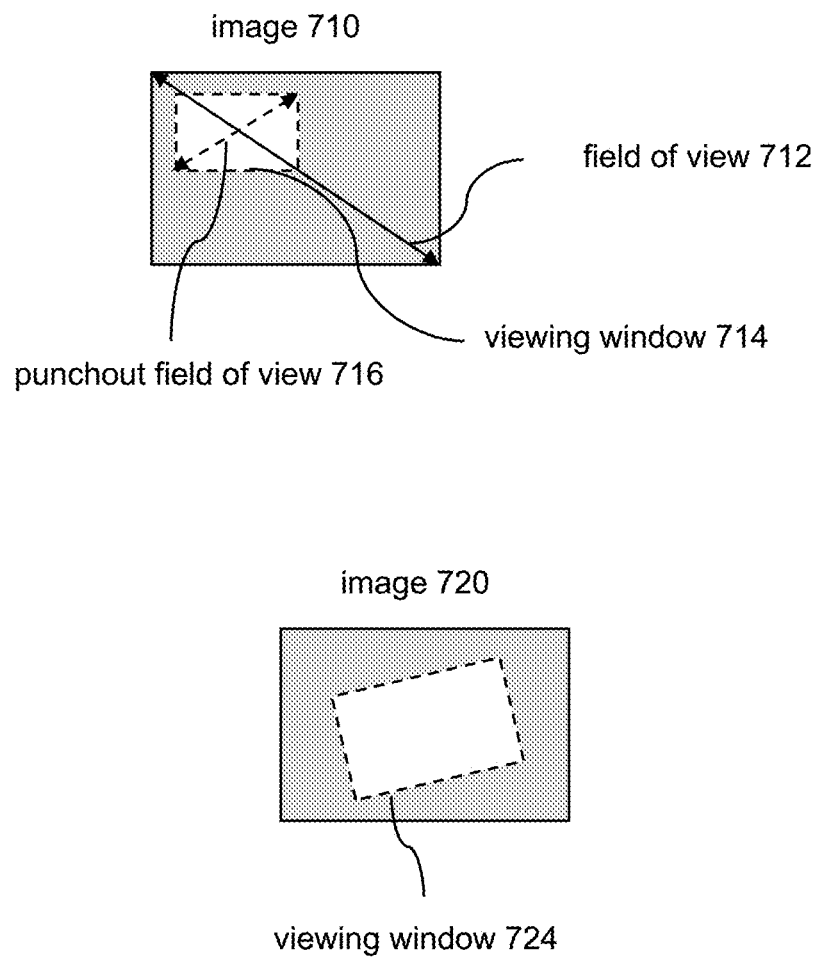
FIG. 7 illustrates example framing of images based on location of viewing window within field of view of images.

FIG. 7 illustrates example framing of images 710, 720 based on location of viewing windows 714, 724 within fields of view 712 of the images 710, 720. The images 710, 720 may include visual content having the field of view 712. For example, the visual content of the images 710, 720 may include depiction of things within the field of view 712 of an image capture device. The visual content of the image 710, 720 may be framed using the viewing windows 714, 724. The viewing windows 714, 724 may have a punchout field of view 716, which may be smaller than the field of view 712 of the images 710, 720. The viewing windows 714, 714 may define the extent(s) of the visual content to be included within punchout of the images 710, 720. The locations of the viewing windows 714, 724 within the field of view 712 of the visual content may determine framing of the visual content. That is, the location of the viewing window 714 (orientation of the viewing window 714 with respect to the field of view 712 of the image 710) may determine the visual content framing of the image 710, and the location of the viewing window 724 (orientation of the viewing window 724 with respect to the field of view 712 of the image 720) may determine the visual content framing of the image 720.

Different context of the video content may result in different framing of the visual content. For example, the image 710 may include a video frame of video content having an action type context, a setting type context, a social type context, and/or other types of context, and the viewing window 714 may be located within the upper left portion of the image 710 based on the context. The image 720 may include a video frame of video content having a different type of context, and the viewing window 724 may be determined differently than the viewing window 714 to be located at the center of the image 720, rotated to the left, and being larger than the viewing window 714 based on the context.

Figure 8A:
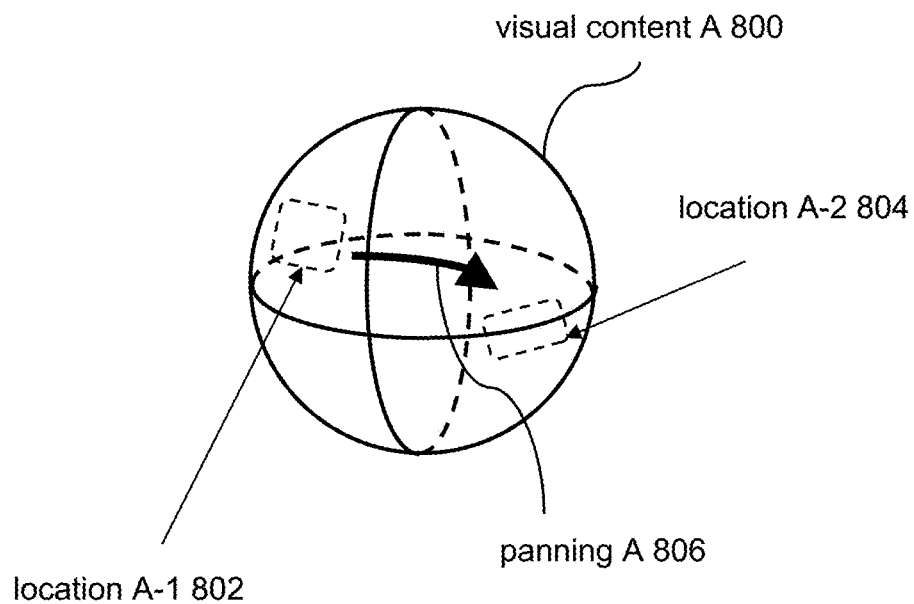
FIGS. 8A-8B illustrate example framing of visual content based on viewing window panning.
Figure 8B:
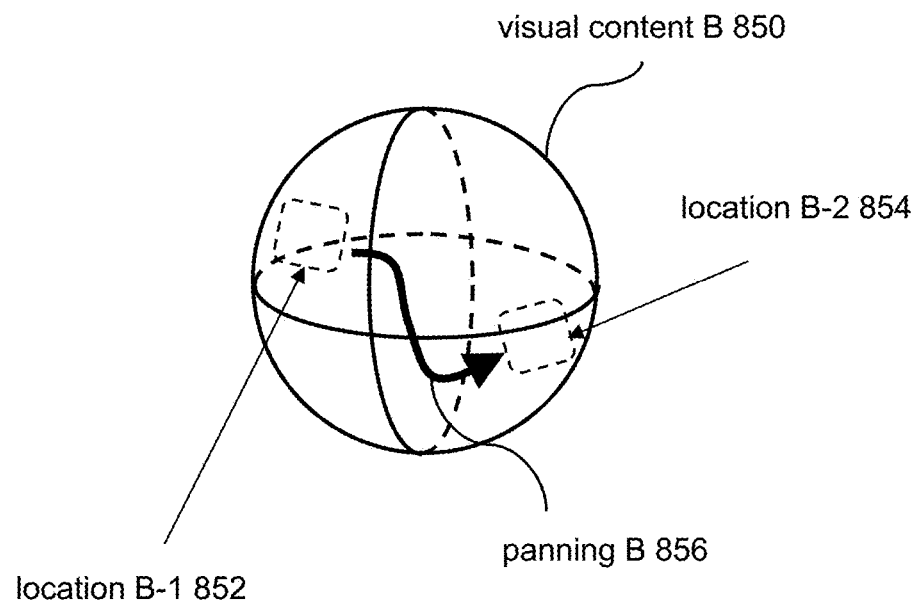

FIGS. 8A-8B illustrate example framing of visual content based on viewing window panning. FIG. 8A may illustrate the path of moving of a viewing window A within visual content A 800 (e.g., spherical visual content). The viewing window A may start from a location A-1 802 and move to a location A-2 804 via a panning A 806. The panning A 806 may occur over the entire progress length of the visual content A 800 or over one or more durations within the progress length of the visual content A 800. The location A-1 802, the location A-2 804, the panning A 806, and/or other characteristic(s) of the viewing window A for the visual content A 800 may be determined based on the context of the video content including the visual content A 800 and/or other information.

FIG. 8B may illustrate the path of moving of a viewing window B within visual content B 850 (e.g., spherical visual content). The viewing window B may start from a location B-1 852 and move to a location B-2 854 via a panning B 856. The panning B 856 may occur over the entire progress length of the visual content B 850 or over one or more durations within the progress length of the visual content B 850. The location B-1 852, the location B-2 854, the panning B 856, and/or other characteristic(s) of the viewing window B for the visual content B 850 may be determined based on the context of the video content including the visual content B 850 and/or other information. The difference in the context of the video content including the visual content A 800 and the video content including the visual content B 850 may result in different determinations of the viewing window A and the viewing window B. For example, the panning may be determined for video content having an action type context so that the viewing window follows action captured within the visual content while the panning may be determined for video content having a setting type context so that the viewing window moves to provide a panning view of a scenery.

Figure 9:
FIG. 9 illustrates example framing of images based on changes in viewing window size.
Figure 9:
Figure 9:
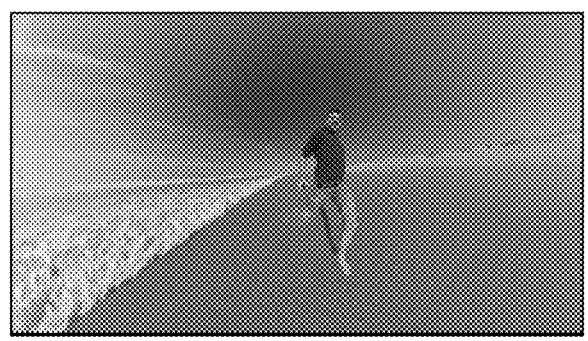
Figure 9:
Figure 9:
Figure 9:

In some implementations, changes in the size of the viewing window may simulate changes in zoom. FIG. 9 illustrates example framing of images based on changes in viewing window size. The images may include spherical video frames of spherical visual content. Views 902, 904, 906, 908, 910, 912 may include extents of the spherical visual content within the viewing window at different moments within the progress length of the spherical visual content. The size of the viewing window may be changed based on the context of the video content including the spherical visual content.

For example, the size of the viewing window may be changed at moments corresponding to one or more particular actions based on the context of the video context including an action type context. Based on the action type context, the size of the viewing window may be progressively made larger at/during moments of the visual content at which a person's right foot hits the ground. The view 902 may correspond to a moment in the visual content at which a person's left foot hits the ground. The view 904 may correspond to a moment in the visual content at which the person's right foot hits the ground. Between the moment corresponding to the view 904 and a moment corresponding to the view 906, the size of the viewing window may be increased, which simulates zooming out of the visual content. For each moment in the visual content at which the person's right foot hits the ground, the size of the viewing window may be increased (e.g., between moment at which the person's right foot hits the ground to moment at which the person's right foot extends behind the person). The size of viewing window may be increased for each such moment to create the views 908, 910. The view 910 may present the largest allowed extent of the spherical visual content. For example, the view 910 may include the entire extent of the spherical video frame and/or may include the extent within the maximum size for the viewing window. The size of the viewing window may then be reduced to provide the view 912, simulating zooming in of the visual content.

Such framing of the visual content may make the presentation of the action within the visual content more interesting and/or pleasing. In some implementations, the speed of the person may impact the amount by which the size of the viewing window is changed. For example, the amount by which the viewing window size is changed may be determined based on the magnitude of the speed of the person. For instance, fast speed (e.g., running) of the person may result in larger change in the size of the viewing window than slow speed (e.g., walking) of the person. Other changes in viewing window size and other prompts to change the viewing window size are contemplated.

Different context of the video content may be associated with different criteria for determining viewing windows. For example, criteria for determining viewing windows for visual content associated with a setting type context may be different from criteria for determining window windows for visual content associated with a social type context, which may be different from criteria for determining window windows for visual content associated with an action type context and/or other types of context.

For example, criteria for determining viewing windows for visual content associated with a setting type context may provide information (e.g., rules, standards, logic) on the use of automatic panning to provide panning views of traveling scenes, landmarks, sceneries, and/or other depictions that emphasize setting aspects of the video content. The panning of the viewing window may use one or more recognitions within the visual content to provide interesting panning views of the captured visual content. For example, referring to FIG. 8A, the viewing window may use the panning A 806, which may trace along a scenic view rather than including shots along the ground or the sky. The viewing windows for visual content associated with a setting type context may use stereographic projection (e.g., little planet view, reverse little planet view) and/or rolling of the visual content to create dynamic views of traveling scenes, landmarks, sceneries, and/or other depictions that emphasize setting aspects of the video content.

Criteria for determining viewing windows for visual content associated with a social type context may provide information (e.g., rules, standards, logic) on use of viewing window placements to focus on social aspects of the visual content. The viewing window placements may use one or more recognitions within the visual content to provide interesting views of the captured visual content that focus on social aspects of the visual content. For example, referring to FIG. 8B, the viewing window may be positioned at locations 852, 854 at different motions to include framing of one or more individuals. The locations and/or sizes of the viewing window may be determined to include faces, particular faces (e.g., using face recognition to detect locations of particular persons in a crowded scene and panning the viewing window between particular persons), particular perspective of faces, particular emotions (e.g., preferring smiling faces over neutral faces), particular motion (e.g., using motion recognition and/or skeletal/pose estimation to detect interesting movement being performed by person(s)), and/or other views of individuals. The viewing window may use the panning B 856 to include depictions of one or more persons (e.g., faces of persons) while switching between the locations 852, 854.

Criteria for determining viewing windows for visual content associated with a social type context may provide different information based on specific social type context. For example, different rules may be provided for determining viewing window for visual content captured during a selfie mode than for visual content captured during interaction of multiple persons. For example, viewing window for visual content captured during a selfie mode may be determined to include a view of the person using the image capture device (selfie-view) and/or a view of the scene that is being looked at by the user (perspective-view).

For instance, location of viewing windows for visual content captured during a selfie mode may be determined based on the gaze of the user in the selfie-view. A user's gaze may refer to how a user of the image capture device is looking at something, such as whether the user is looking at a particular object and/or an event steadily (e.g., the user is looking at an object or an event for a threshold amount of time). A user's gaze may be characterized by one or more directions in which the user is looking. The direction(s) in which the user is looking may correspond to viewing direction(s) for visual content (e.g., spherical visual content). A user's gaze may be determined based on analysis of one or more body parts of the user. For example, a user's gaze may be determined based on visual analysis of the location/orientation of the user's eyes, the user's iris, the user's nose, the user's head, and/or other parts of the user's head. The determination of user's gaze may be facilitated through use of other information about the user, such as information on the user's body pose (e.g., the user extending a hand/finger in a particular direction), information on the user's vocal cues about locations of interest (e.g., the user stating whether the location of interest is in front, to the left, to the right, behind, above, or below the user), and/or other information.

The visual content within the selfie-view may be used to track the user's gaze and automatically determine viewing window for the visual content within the perspective-view. For example, the user's gaze tracked within the selfie-view may be used to determine where interesting things are happening within the visual content within the perspective-view. The visual content within the multiple viewing windows may be presented at the same time (e.g., a side-by-side view, a picture-in-picture view) and/or at different times (e.g., switching between selfie-view and perspective-view).

As another example, viewing window for visual content captured during an interaction of multiple persons may be determined to include views of the multiple persons. For instance, location of viewing windows for visual content captured during an interaction of multiple persons may be determined to include views of active participants (e.g., speakers, performers). The viewing window may be located within the field of view of the visual content to include one or more framings of the active participants. For example, the interaction of multiple persons may include an exchange of speech (e.g., interview) between two persons, and the viewing windows may be positioned to frame the two persons. The framing of the two persons may be made consistent so that the two persons are presented in the same perspective or similar perspectives within the punchouts using the two viewing windows. As another example, the interaction of multiple persons may include a presentation of information by a speaker to a crowd of persons, and the viewing windows may be positioned to frame the active participants (e.g., speaker, audience member(s) asking questions), the non-active participants (e.g., audience) and/or the presented information (e.g., screen displaying presented information). The visual content within the multiple viewing windows may be presented at the same time (e.g., a side-by-side view, a picture-in-picture view) and/or at different times (e.g., switching between speaker/interviewer-view and audience/interviewee-view). For instance, directional audio and/or voice detection may be used to determine which person (e.g., interviewer, interviewee, speaker, audience) is speaking and the visual content within the viewing window corresponding to the speaking person may be presented. Other criteria are contemplated.

In some implementations, particular viewing windows may be determined for particular moments within the progress length of the video content, and the viewing window between the particular moments may be determined based on the particular viewing windows. For example, referring to FIG. 8A, the viewing window may be determined to be located at the location A-1 802 at a moment within the progress length and at location A-2 804 at a subsequent moment within the progress length. The viewing window for the duration between the two moments may be determined based on the viewing window at the location A-1 802 and at the location A-2 804. For example, the viewing window for the in-between duration may be determined to include the panning A 806, so that the viewing window moves from the location A-1 802 to the location A-2 804 over the in-between duration.

The determination of the viewing window at the particular moments may be referring to as key-framing of the viewing window. The key-framing of the viewing window (providing key-framing of the visual content) at key-framing moments may be used determine one or more characteristics of the viewing window (e.g., size, rotation, panning) for durations between the key-framing moments. The viewing window for in-between durations may be determined based on the key-framing of the viewing window at the key-framing moments to provide transitions (e.g., interpolated transition, smoothed transition, linear transition, curved transition) of the key-framing of the viewing windows. For example, viewing direction, viewing size, and/or viewing rotation of the viewing window may change from one key-framing moment to another key-framing moment and provide the characteristic(s) of the viewing window between the key-framing moments.

In some implementations, the viewing windows may be determined at particular moments (e.g., key-framing moments) within the progress length based on detection of one or more highlight moments. A highlight moment may refer to a moment at which a highlight event occurs. A highlight event may refer to an exciting, interesting, and/or an important event, such as a high point or a climax of an activity being performed by one or more users. A highlight event may be an event of interest. A highlight event/moment may be detected based on one or more of visual content analysis (e.g., blur detection, color analysis, face recognition, histogram analysis, object recognition, motion recognition, skeletal/pose estimation, activity recognition, scene recognition, salience detection, emotion recognition), audio content analysis (e.g., voice recognition, command recognition, activity recognition, emotion detection), user input analysis (e.g., a user interacting with a highlight button), metadata analysis (e.g., telemetry data, GPS data, IMU data, speed data, velocity data, acceleration data, rotation data), and/or other information. For example, a highlight moment/event may be detected based on occurring of one or more categorized events, and the viewing window at the highlight moment may be determined. The highlight moments may be used as key-framing moments, and the viewing windows determined at the highlight moments may provide key-framing of the viewing window. Viewing window for the moments between the highlight moments may be determined based on the key-framing of the viewing window at the highlight moments.

In some implementations, determination of the viewing window may include determination of one or more projections to be used in presenting the extent(s) of the visual content within the viewing window. A projection may refer to how spatial portions of the visual content (e.g., pixels) are mapped once a plane for presentation. For example, one or more spatial portions of the spherical visual content may be mapped onto a plane for presentation on a two-dimensional display. Different projections may result in different types/styles of presentation of the spherical visual content. Example projections include equirectangular projection, stereographic projection (e.g., little planet view, reverse little planet view), cylindrical projection, Mercator projection, Miller projection, azimuthal projection, rectilinear projection, fisheye projection, equisolid projection, orthographic projection, Pannini projection, and/or other projections.

Projection of the visual content within the viewing window may further determine the framing of the visual content. The viewing window may be determined to include one or more changes in projection of the visual content based the context of the video content and/or other information. For example, a change in the projection of the visual content may include a switch between a non-stereographic projection (e.g., equirectangular projection, rectilinear) and a stereographic projection to present the extents of the visual content within the viewing window.

For example, the viewing window may be determined to include one or more changes in projection of the visual content (such as a switch between a non-stereographic projection and a stereographic projection to present the extents of the visual content within the viewing window) based on the motion of an image capture device including the image capture device being thrown during capture of the video content, the motion of a thing depicted within the visual content including the thing jumping or being thrown, and/or other motion. The motion of the image capture device may be determined based on position information (e.g., speed, gravity direction) and/or other information. The motion of the thing depicted within the visual content may be determined based on visual analysis, position information of a device (e.g., position sensor, mobile device including a position sensor) carried by the user, and/or other information.

For example, a non-stereographic projection may be used for the visual content within the viewing window before and/or when the image capture device/thing begins the upward motion (e.g., before moving away from the gravity direction). A stereographic projection may be used for the visual content within the viewing window when the image capture device/thing reaches the top of the upward motion (e.g., speed in the direction away from the gravity direction slows down to zero). The non-stereographic projection may be used for the visual content within the viewing window after and/or when the image capture device/thing finishes the downward motion (e.g., landing). The projection may transition (e.g., interpolated transition, smoothed transition, linear transition, curved transition) from the non-stereographic projection to the stereographic projection during the upward motion and transition from the stereographic projection to the non-stereographic projection during the downward motion. Other changes in projection based on motion are contemplated.

In some implementations, the size of the viewing window may change based on the motion of an image capture device including the image capture device being thrown during capture of the video content, the motion of a thing depicted within the visual content including the thing jumping or being thrown, and/or other motion. For example, the size of the viewing window may be at its smallest before and/or when the image capture device/thing begins the upward motion (e.g., before moving away from the gravity direction). The size of the viewing window may be at its largest (e.g., covering the entire spherical extent of the visual content) when the image capture device/thing reaches the top of the upward motion. The size of the viewing window may be at its smallest after and/or when the image capture device/thing finishes the downward motion. Other changes in viewing window based on motion are contemplated.

Figure 10:
FIG. 10 illustrates example framing of images based on changes in projection.
Figure 10:
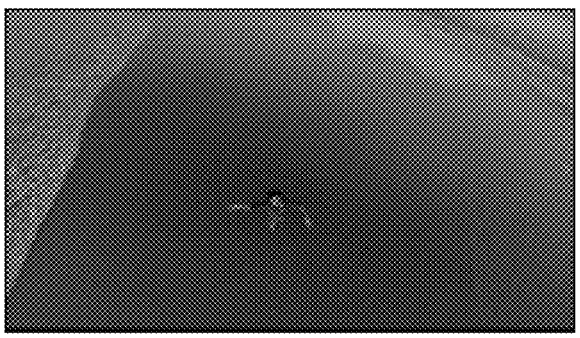
Figure 10:
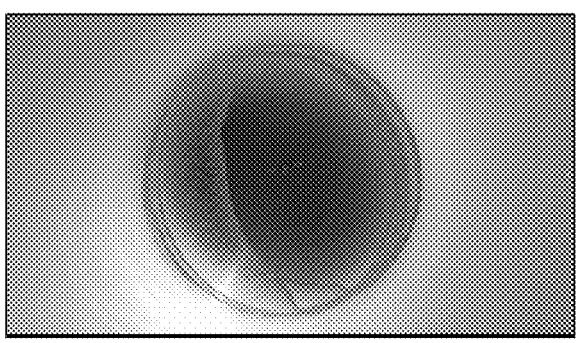
Figure 10:
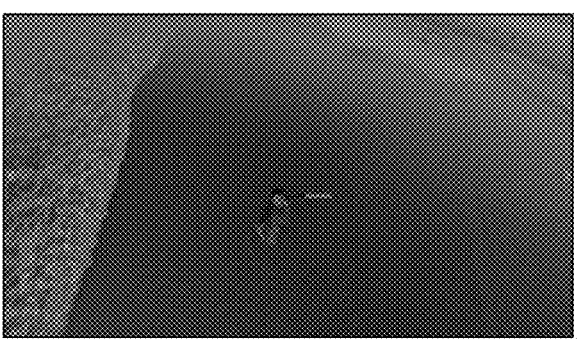
Figure 10:

FIG. 10 illustrates example framing of images based on changes in projection. The images may include spherical video frames of spherical visual content. The spherical visual content may have been captured by an image capture device during a capture duration. The spherical visual content may have been captured based on the image capture device being thrown by a user into the air, moving upwards until stopping at the maximum height, and moving downwards until being caught by the user. Views 1002, 1004, 1006, 1008, 1010 may include extents of the spherical visual content within the viewing window at different moments within the progress length of the spherical visual content. The projection of the visual content within the viewing window may be changed based on motion of the image capture device.

For example, the view 1002 may correspond to a moment in the visual content at which the image capture device is thrown by the user. The projection for the visual content within the view 1002 may be/close to a non-stereographic projection. The view 1004 may correspond to a moment in the visual content at which the image capture device is moving upwards. The projection for the visual content within the view 1004 may be between the non-stereographic projection and a stereographic projection. The viewing window for the view 1004 may be larger than the viewing window for the view 1002. The view 1006 may correspond to a moment in the visual content at which the image capture device reaches the maximum height and has zero upward/downward speed. The projection for the visual content within the view 1006 may be/close to a stereographic projection. The viewing window for the view 1006 may be larger than the viewing window for the view 1004. The viewing window for the view 1006 may be at its maximum size.

The view 1008 may correspond to a moment in the visual content at which the image capture device is moving downwards. The projection for the visual content within the view 1008 may be between the stereographic projection and the non-stereographic projection. The viewing window for the view 1008 may be smaller than the viewing window for the view 1006. The view 1010 may correspond to a moment in the visual content at which the image capture device is captured by the user. The projection for the visual content within the view 1010 may be/close to the non-stereographic projection. The viewing window for the view 1010 may be smaller than the viewing window for the view 1010.

Figure 11:
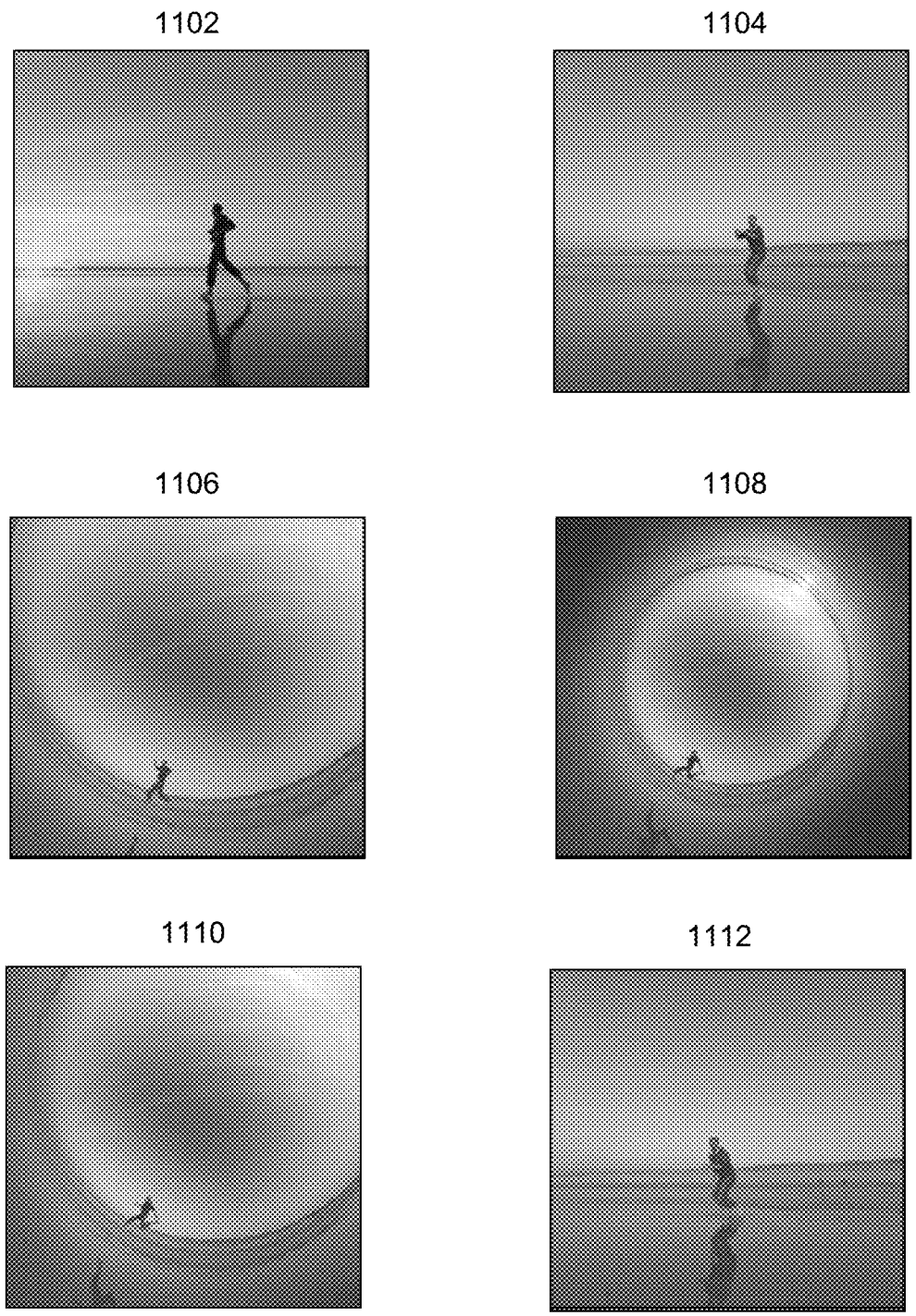
FIG. 11 illustrates example framing of images based on changes in projection.

FIG. 11 illustrates example framing of images based on changes in projection. The images may include spherical video frames of spherical visual content. The spherical visual content may have been captured by an image capture device during a capture duration. The spherical visual content may have been captured while a user is within the field of view (e.g., around) the image capture device. The user may jump up and land during the capture duration. Views 1102, 1104, 1106, 1108, 1110, 1112 may include extents of the spherical visual content within the viewing window at different moments within the progress length of the spherical visual content. The projection of the visual content within the viewing window may be changed based on motion of user within the visual content. The viewing window may pan to keep the user within the viewing window.

For example, the view 1102 may correspond to a moment in the visual content at which the user is running around the image capture device. The projection for the visual content within the view 1102 may be a non-stereographic projection. The view 1104 may correspond to a moment in the visual content at which the user begins the jump off the ground. The projection for the visual content within the view 1104 may be/close to a non-stereographic projection. The viewing window for the view 1104 may be larger than the viewing window for the view 1102. The view 1106 may correspond to a moment in the visual content at which the user is moving upwards. The projection for the visual content within the view 1106 may be between the non-stereographic projection and a stereographic projection. The viewing window for the view 1106 may be larger than the viewing window for the view 1104. The view 1108 may correspond to a moment in the visual content at which the user reaches the maximum height and has zero upward/downward speed. The projection for the visual content within the view 1108 may be/close to a stereographic projection. The viewing window for the view 1108 may be larger than the viewing window for the view 1108. The viewing window for the view 1108 may be at its maximum size.

The view 1110 may correspond to a moment in the visual content at which the user is moving downwards. The projection for the visual content within the view 1110 may be between the stereographic projection and the non-stereographic projection. The viewing window for the view 1110 may be smaller than the viewing window for the view 1108. The view 1112 may correspond to a moment in the visual content at which the user lands on the ground. The projection for the visual content within the view 1112 may be/close to the non-stereographic projection. The viewing window for the view 1112 may be smaller than the viewing window for the view 1110.

In some implementations, a change in projection may include one or more changes in perspective distortion. A perspective distortion may refer to warping and/or transformation of things depicted within the visual content to look differently based on relative distances between the things and the location of visual content capture.

Figure 12:
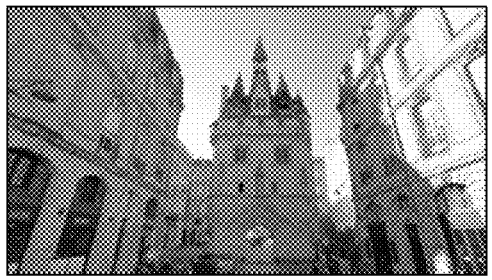
FIG. 12 illustrates example framing of images based on changes in perspective distortion.
Figure 12:
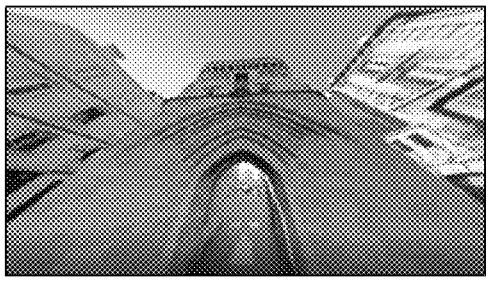
Figure 12:
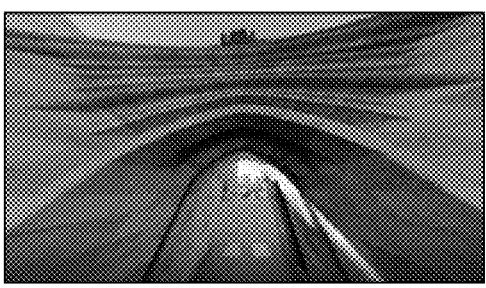
Figure 12:
Figure 12:
Figure 12:
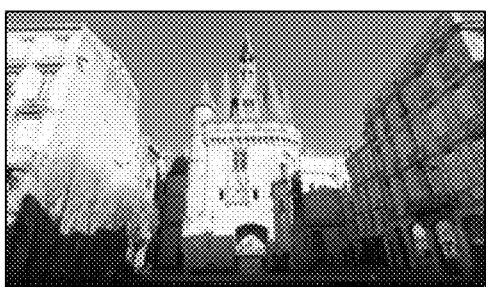

FIG. 12 illustrates example framing of images based on changes in perspective distortion. The images may include spherical video frames of spherical visual content. The spherical visual content may have been captured by an image capture device during a capture duration. The spherical visual content may have been captured while the image capture device moves through a tunnel under a building. Views 1202, 1204, 1206, 1208, 1210, 1212 may include extents of the spherical visual content within the viewing window at different moments within the progress length of the spherical visual content. The projection of the visual content within the viewing window may be changed to include different perspective distortion based on motion of image capture device through the tunnel. For example, perspective distortion may be increased based on distance between the image capture device and a target getting smaller, and perspective distortion may be decreased based on distance between the image capture device and a target getting larger. The viewing direction of the viewing window may be directed to keep the building/tunnel within the viewing window.

For example, the view 1202 may correspond to a moment in the visual content at which the image capture device is approaching the building/tunnel. The projection for the visual content within the view 1202 may include slight perspective distortion. The view 1204 may correspond to a moment in the visual content at which the image capture device is close to the building/tunnel. The projection for the visual content within the view 1204 may include more perspective distortion than the view 1202. The view 1206 may correspond to a moment in the visual content at which the image capture device has entered the building/tunnel. The projection for the visual content within the view 1206 may include more perspective distortion than the view 1204.

The view 1208 may correspond to a moment in the visual content at which the image capture device is located on the other side of the building/tunnel compared to the moment corresponding to the view 1206. The projection for the visual content within the view 1208 may include the same/similar perspective distortion as the view 1206. The viewing direction for the viewing window may be flipped to keep the building/tunnel within the viewing window. The view 1210 may correspond to a moment in the visual content at which the image capture device is leaving the building/tunnel. The projection for the visual content within the view 1210 may include less perspective distortion than the view 1208. The projection for the visual content within the view 1210 may include the same/similar perspective distortion as the view 1204. The view 1212 may correspond to a moment in the visual content at which the image capture device is located on the other side of the building compared to the moment corresponding to the view 1202 (same magnitude of distance away from the building). The projection for the visual content within the view 1212 may include less perspective distortion than the view 1210. The projection for the visual content within the view 1212 may include the same/similar perspective distortion as the view 1202.

The generation component 108 may be configured to generate the framed visual content based on the viewing window and/or other information. The framed visual content may include a punchout of the extent(s) of the visual content within the viewing window. The framed visual content may be generated to provide a framed view of the visual content. Different framed visual content may be generated to provide differently framed views of the visual content based on different context of the video content. For example, different context of the video content may result in generation of framed visual content with different types and/or different styles of framing of the visual content.

In some implementations, framed visual content may be generated as images/video frames including extent(s) of the visual content within the viewing window. Framed visual content may be generated as outputs of portions of the visual captured by the image capture device, with the outputted portions including extent(s) of the visual content within the viewing window. Inclusion of the extent(s) of the visual content defined by the viewing window within the framed visual content may effectuate framing of the visual content via selective cropping. The portions of the visual content that are cropped for framing may depend on the context of the video content and/or other information.

In some implementations, the framed visual content may be generated as an encoded version/copy of the framed visual content (e.g., encoded video file) and/or a director track that defines the extents of the visual content to be used during playback. For example, the framed visual content may be generated as video frames in a video file, and the video file may be opened in a video player for presentation of the framed visual content. The framed visual content may be generated as instructions to render the visual content for presentation. The instructions (e.g., director track) may which define visual portions of the visual content (images, video frames) should be included within the presentation of the video content. The instructions may include information on the location, size, shape, and/or rotation of the punchout of images/video frames to be used to as a function progress through the progress length of the visual content to provide a framed view of the images/video frames. A video player may use the instructions to retrieve the relevant visual portions of the images/video frames when the visual content is opened and/or is to be presented.

The generation component 108 may be configured effectuate storage of the framed visual content and/or other information in one or more storage media. For example, the framed visual content (e.g., video file, director track) may be stored in the electronic storage 13, remote storage locations (storage media located at/accessible through a server), and/or other locations. In some implementations, the generation component 108 may effectuate storage of the framed visual content through one or more intermediary devices. For example, the processor 11 may be located within a computing device without a connection to the storage device (e.g., the computing device lacks WiFi/cellular connection to the storage device). The generation component 108 may effectuate storage of the framed visual content through another device that has the necessary connection (e.g., the computing device using a WiFi/cellular connection of a paired mobile device, such as a smartphone, tablet, laptop, to store information in one or more storage media). Other storage locations for and storage of the framed visual content are contemplated.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, Li-Fi communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
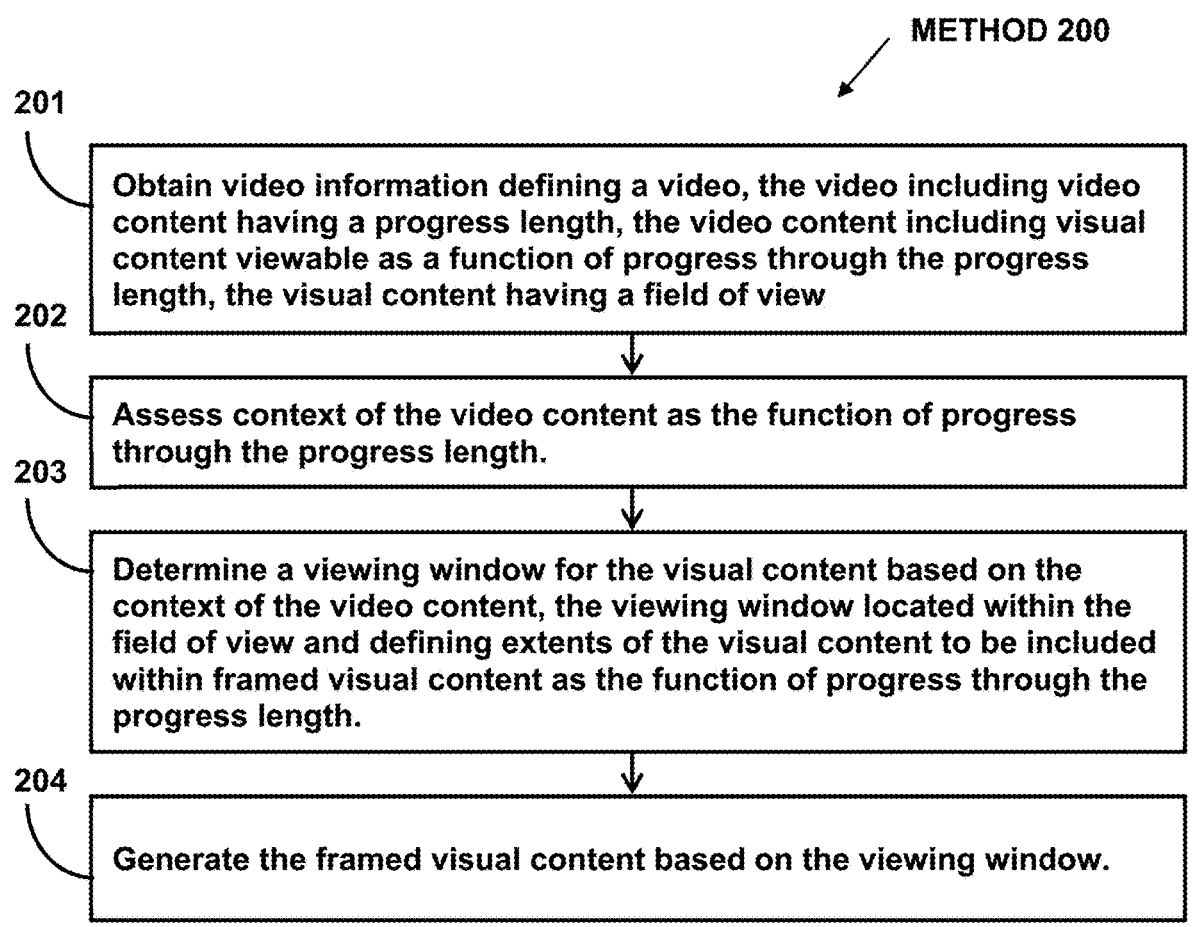
FIG. 2 illustrates an example method for framing videos.

FIG. 2 illustrates method 200 for framing videos. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 201, video information defining a video may be obtained. The video may include video content having a progress length. The video content may include visual content viewable as a function of progress through the progress length. The visual content may have a field of view. In some implementation, operation 201 may be performed by a processor component the same as or similar to the video information component 102 (Shown in FIG. 1 and described herein).

At operation 202, context of the video content as the function of progress through the progress length may be assessed. In some implementation, operation 202 may be performed by a processor component the same as or similar to the context component 104 (Shown in FIG. 1 and described herein).

At operation 203, a viewing window for the visual content may be determined based on the context of the video content and/or other information. The viewing window may be located within the field of view of the visual content. The viewing window may extents of the visual content to be included within framed visual content as the function of progress through the progress length. Location of the viewing window within the field of view of the visual content may determine framing of the visual content. In some implementation, operation 203 may be performed by a processor component the same as or similar to the viewing window component 106 (Shown in FIG. 1 and described herein).

At operation 204, the framed visual content may be generated based on the viewing window and/or other information. The framed visual content may include a punchout of the extents of the visual content within the viewing window. In some implementation, operation 204 may be performed by a processor component the same as or similar to the generation component 108 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system that frames videos, the system comprising:
one or more physical processors configured by machine-readable instructions to:
obtain video information defining a video, the video including video content having a progress length, the video content including visual content viewable as a function of progress through the progress length, the visual content having a field of view;
assess context of the video content as the function of progress through the progress length;
determine a viewing window for the visual content based on the context of the video content, the viewing window located within the field of view and defining extents of the visual content to be included within framed visual content as the function of progress through the progress length, wherein location of the viewing window within the field of view of the visual content determines framing of the visual content; and
generate the framed visual content based on the viewing window, the framed visual content including a punchout of the extents of the visual content within the viewing window.

2. The system of claim 1, wherein the video content includes spherical video content, the spherical video content including the visual content viewable from a point of view as the function of progress through the progress length, the field of view being a spherical field of view.

3. The system of claim 1, wherein the context of the video content is assessed as being of an action type, a setting type, or a social type.

4. The system of claim 1, wherein the context of the video includes capture motion of the video content and/or content motion of the video content.

5. The system of claim 4, wherein the capture motion of the video content includes motion of an image capture device that captured the video content.

6. The system of claim 5, wherein projection of the visual content within the viewing window further determines the framing of the visual content, and the viewing window is determined to include a change in projection of the visual content based on the motion of the image capture device including the image capture device being thrown during capture of the video content.

7. The system of claim 6, wherein the change in projection of the visual content includes a switch between a non-stereographic projection and a stereographic projection to present the extents of the visual content within the viewing window based on the motion of the image capture device including the image capture device being thrown during capture of the video content.

8. The system of claim 4, wherein the content motion of the video includes motion of a thing captured within the video content.

9. The system of claim 8, wherein projection of the visual content within the viewing window further determines the framing of the visual content, and the viewing window is determined to include a change in projection of the visual content based on the motion of the thing including the thing jumping or being thrown.

10. A method for framing videos, the method performed by a computing system including one or more processors, the method comprising:
obtaining, by the computing system, video information defining a video, the video including video content having a progress length, the video content including visual content viewable as a function of progress through the progress length, the visual content having a field of view;
assessing, by the computing system, context of the video content as the function of progress through the progress length;
determining, by the computing system, a viewing window for the visual content based on the context of the video content, the viewing window located within the field of view and defining extents of the visual content to be included within framed visual content as the function of progress through the progress length, wherein location of the viewing window within the field of view of the visual content determines framing of the visual content; and generating, by the computing system, the framed visual content based on the viewing window, the framed visual content including a punchout of the extents of the visual content within the viewing window.

11. The method of claim 10, wherein the video content includes spherical video content, the spherical video content including the visual content viewable from a point of view as the function of progress through the progress length, the field of view being a spherical field of view.

12. The method of claim 10, wherein the context of the video content is assessed as being of an action type, a setting type, or a social type.

13. The method of claim 10, wherein the context of the video content includes capture motion of the video content and/or content motion of the video content.

14. The method of claim 13, wherein the capture motion of the video content includes motion of an image capture device that captured the video content.

15. The method of claim 14, wherein projection of the visual content within the viewing window further determines the framing of the visual content, and the viewing window is determined to include a change in projection of the visual content based on the motion of the image capture device including the image capture device being thrown during capture of the video content.

16. The method of claim 15, wherein the change in projection of the visual content includes a switch between a non-stereographic projection and a stereographic projection to present the extents of the visual content within the viewing window based on the motion of the image capture device including the image capture device being thrown during capture of the video content.

17. The method of claim 13, wherein the content motion of the video includes motion of a thing captured within the video content.

18. The method of claim 17, wherein projection of the visual content within the viewing window further determines the framing of the visual content, and the viewing window is determined to include a change in projection of the visual content based on the motion of the thing including the thing jumping or being thrown.

19. A system that frames videos, the system comprising:
one or more physical processors configured by machine-readable instructions to:
obtain video information defining a video, the video including spherical video content having a progress length, the spherical video content including visual content viewable from a point of view as a function of progress through the progress length, the visual content having a spherical field of view;
assess context of the video content as the function of progress through the progress length;
determine a viewing window for the visual content based on the context of the video content, the viewing window located within the field of view and defining extents of the visual content to be included within framed visual content as the function of progress through the progress length, wherein location of the viewing window within the field of view of the visual content determines framing of the visual content, further wherein projection of the visual content within the viewing window further determines the framing of the visual content, and the viewing window is determined to include a change in projection of the visual content based on context of the video content; and
generate the framed visual content based on the viewing window, the framed visual content including a punchout of the extents of the visual content within the viewing window.

20. The system of claim 19, wherein:
the context of the video content includes motion of an image capture device that captured the video content and/or motion of a thing captured within the video content; and
the change in projection of the visual content includes a switch between a non-stereographic projection and a stereographic projection to present the extents of the visual content within the viewing window based on the motion of the image capture device including the image capture device being thrown during capture of the video and/or the motion of the thing including the thing jumping or being thrown.

* * * * *